Dec. 14, 1937. C. B. DREYER Re. 20,582

ART OF COMPOSITE PHOTOGRAPHY

Original Filed July 2, 1934

Inventor

Charles B. Dreyer

By Lyon & Lyon

Attorneys

Reissued Dec. 14, 1937

Re. 20,582

UNITED STATES PATENT OFFICE 20,582

ART OF COMPOSITE PHOTOGRAPHY

Charles B. Dreyer, Los Angeles, Calif., assignor to Henry F. Boeger, Los Angeles, Calif.

Original No. 2,056,508, dated October 6, 1936, Serial No. 733,403, July 2, 1934. Application for reissue November 28, 1936, Serial No. 113,266

12 Claims. (Cl. 88—16)

This invention relates to a method of producing composite photographic records, such as composite records of images originally photographically recorded on separate films. Methods of composite photography are particularly useful in cinematography wherein it is often highly desirable to create illusions or to form a single transparency, suitable for projection and exhibition, such transparency bearing thereon images of objects or scenes photographed at differing times in different localities. The background, for example, may have been taken in the Swiss Alps whereas the foreground objects or actors may have been photographed within the studio. By being able to produce a composite photograph bearing the foreground in proper relationship to the background, the cost of transporting actors to foreign lands is obviated.

Heretofore, methods of composite photography necessitated the use of mats or masks and numerous positive, negative and intermediate films in the preparation of finished positives or negatives containing composite images. As a result, the film cost and the cost of developing, printing, etc., constituted a very material item. The present invention, on the other hand, permits the formation of a composite negative from the two negatives bearing the foreground and background respectively without the necessity of forming separate mats or other film strips. It has been discovered that when the film on which the final composite image or scene is to be recorded is of such character as to permit the formation of an unstable latent image, which image would be normally capable of being converted into a negative by further exposure to light of various wave lengths or capable of total or partial destruction or non-developability by exposure to long wave lengths, the latent image of the background can be impressed upon the final stock and portions of such background image then destroyed so as to leave spaces into which the foreground may be printed. The final or composite stock may then be converted into either a positive or a negative, depending upon the character and intensity of light to which the stock is exposed during development.

In other words, the images impressed, destroyed and retained or reversed in the emulsion of the final stock or composite film are controlled by varying the intensity and frequency or character of the lighting used during the printing, recording, fading and/or reversing operations.

More specifically stated, one preferred method of carrying out this invention comprises forming a latent unstable image impression of the background image upon the final negative, then destroying those portions of the latent background image upon the final negative in which foreground is to be recorded, then forming a latent unstable image of foreground in those portions of the final negative in which the background image was destroyed, and finally exposing the final negative, during development, to light of substantially the entire spectrum to produce a composite negative.

It is an object of the invention, therefore, to provide a method of producing composite photographic recordings in a rapid, simple and economical manner.

Another object is to provide a method of producing composite photographs from separate negatives by regulated and successive use of light of short and long wave lengths.

A further object is to provide a method of forming composite photographs from two or more separate records in which a latent, unstable image is first formed and parts of said image then destroyed.

Again, an object of this invention is to provide a method of composite photography in which composite negatives may be obtained from separate negatives of foreground and background without the necessity of using positives or of dubbing.

These and other objects, uses, advantages, modifications and adaptations of the invention will become apparent to those skilled in the art from the following detailed description of a preferred method of carrying out the invention and certain modifications thereof. In this description use will be repeatedly made of the words "final negative". By this term reference will be had to the final composite film bearing the combined images of the separately taken source films.

It is to be understood that the term "negative" as used herein is used in its broad sense and includes a film carrying an image either in positive form or in negative form, since the process may be conducted by using either normal negatives or normal positives for the source films. In order to facilitate understanding, the terms "negative form" and "positive form" will be used whenever a photographic reversal in form of image is referred to. Again, in the subsequent description reference will be had to foreground and background source negatives but it is to be understood that the final negative may record not only the images originally carried by two separate negatives but may also carry the images from a greater number of source negatives.

In describing the invention, reference will be had to the appended drawing, in which Fig. 1 represents a positive image of a background scene.

Figure 5:
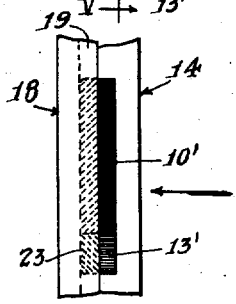

Fig. 5 diagrammatically represents the formation of a latent unstable image on the final negative.

Figure 6:
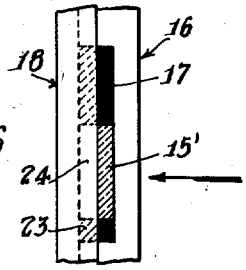

Fig. 6 diagrammatically represents a second step in the formation of a composite negative.

Figure 7:
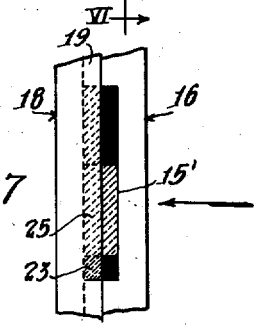

Fig. 7 represents the third step in the formation of a composite negative.

Figure 8:
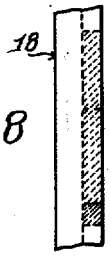

Fig. 8 represents the fourth step in the formation of a composite negative.

Figure 9:
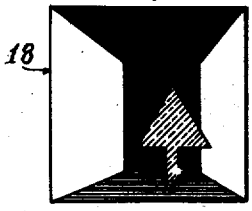

Fig. 9 represents the completed composite negative.

Figure 1:
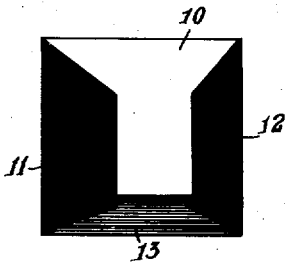
Figure 3:
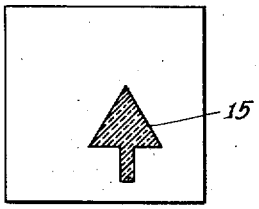
Fig. 3 is a positive of foreground or action.
Figure 2:
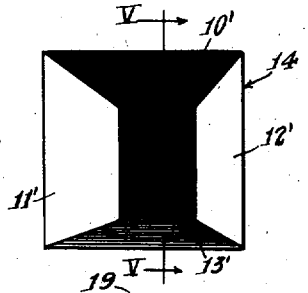
Fig. 2 is the negative of Fig. 1.
Figure 4:
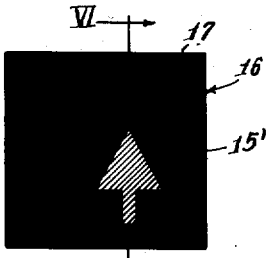
Fig. 4 is a negative of such action or foreground.

As shown in Fig. 1, the background scene has a substantially white field 10 with two side planes 11 and 12 which are dark. The foreground of this scene is of an intermediate shade, indicated at 13. As a result, the field of the negative shown in Fig. 2 is substantially black, as indicated at 10', whereas the sides 11' and 12' are transparent. The foreground 13' is intermediate in shade or density. The negative film will be generally identified by the numeral 14.

The foreground which it is desired to introduce into the scene carried by the film image of Fig. 1 may consist of a tree 15. This tree (or other foreground object) is preferably photographed in front of an actinic background such as a white or blue background, resulting in a negative indicated by the numeral 16 bearing the image of the tree 15' on a substantially opaque field 17.

For the purpose of producing negatives with dense fields, the film on which the negative 16 is obtained may well be a panchromatic film with a surface emulsion of panchromatic type coated upon a lower emulsion layer of the fast bromide type. A duplicating negative stock manufactured by Eastman Kodak Company is a fine grained film suitable for use in this process.

In combining the two scenes, and particularly in combining the images carried by the background negative 14 and the foreground negative 16, it is desirable to use a film for the final negative which is fast and has a maximum sensitivity to wave lengths of the violet and ultraviolet portions of the spectrum. Through experience it has been found that the preferable final stock emulsion should be substantially free from iodides and chlorides as films answering this requirement appear to give the best results. This final negative stock is indicated in section at 18, the emulsion layer being indicated at 19.

In the first step of the process, the background negative 14 is placed in printing relation to the final negative stock 18, as shown in Fig. 5, and subjected to the action of a printing light of short wave length so as to form a latent, unstable image impression in the emulsion 19 of the final negative stock 18. Fig. 5, which includes a vertical section taken along the plane V—V of Fig. 2, shows that the intermediate foreground portion 13' of the background negative extends for a considerable distance up into the picture area.

It has been found that light of a wave length shorter than about 0.5 micron (5000 A°) should be used. The time of exposure should be 1 second or less, depending somewhat upon whether or not the final negative stock 18 has been pre-treated and the character of such pretreatment. At all events, the result of the operation should be that an unstable image impression of the background is formed in the emulsion 19 of the final negative 18.

After the completion of this printing operation the background negative 14 is removed and the foreground negative 16 substituted in its stead. At this time attention is called to the fact that the emulsion 19 of the final negative 18 has received a latent impression of, for example, the foreground 13', this impression being indicated at 23. After the foreground negative 16 is placed in printing relation with the final negative 18, it is subjected to a fading light capable of destroying those portions of the latent background image upon the negative 18 in which the foreground object is to be recorded. In Fig. 6, 15' represents the image of the object carried by the foreground negative and the fading light passes through this image, thereby destroying a portion of the latent image 23 which had been formed during the first printing step. The destruction of the background latent image is indicated by the blank space 24. The portion of the background latent image which has been destroyed in this manner will not result in a visible image in the event the film is developed at this stage of the process.

In destroying the latent background image, it is desirable to use light of a frequency below the normal sensitive range of the emulsion 19. In other words, the light used during the fading operation, indicated in Fig. 6, should be longer in wave length than that to which the final negative emulsion 19 is sensitive, ordinarily light longer in wave length than about 0.6 micron (6000 A°).

It is to be observed that inasmuch as the field 17 of the foreground negative 16 is dense and practically opaque, the fading light does not affect those portions of the latent image of the emulsion 19 which are covered by such field 17.

It may be mentioned that the time of exposure to the long wave lengths during this fading operation may be as much as 5 seconds without deleterious effect upon the final negative emulsion 19.

After having thus made a space in the final negative emulsion 19 for the reception of an image of the foreground, the operation indicated in Fig. 7 is performed. This is a printing operation in which the foreground negative 16 is printed upon the final negative stock 18 by the use of light of short wave length, such as ultraviolet or light shorter in wave length than about 0.5 micron. It is not necessary to move the foreground negative 16 with respect to the final negative stock 18 during the fading and printing operations. As indicated in Fig. 7, the image of the tree 15' is thus printed into the space 24, resulting in an image 25.

At the conclusion of this last printing operation which preferably consumes less than 5 seconds (determined by the source and intensity of the light), the foreground negative 16 is removed, resulting in an undeveloped film 18 (indicated in Fig. 8) bearing latent images of both foreground and background negatives 16 and 14. This film is then developed but during development the film is exposed to light of substantially the entire visible spectrum, that is, to wave lengths both above 0.6 micron and below 0.5 micron. The length of time or duration of exposure at this stage regulates the contrast obtained in the final negative. The light should be applied before the development is complete and at all times before the fixing operation. Upon development, the film 18 is found to be a negative of the character shown in Fig. 9 bearing a negative record of both the foreground and background images in a suitable relationship to each other. No "ghost" or shadow, for example, is visible in the developed film. If the film is not exposed to light during development, then a composite positive is obtained instead of the negative described hereinabove.

Reference has been made hereinabove to the pretreatment of the negative film 18. This pretreatment is for the purpose of limiting the sensitivity of the emulsion 19 to only very short wave lengths, such as wave lengths shorter than ultraviolet. Furthermore, the pretreatment should render the film capable of forming the latent unstable images in a short period of time and should also aid the ability of the emulsion to permit destruction of the latent image by light of wave lengths longer than those to which the emulsion is normally sensitive. The film may be subjected to washes with various and sundry materials; solutions of quinine sulfate, methylene blue, fluorescein, potassium ferricyanide, etc., have been successfully used.

One solution which has been found very effective comprises 5 grams ferricyanide, 10 milligrams methylene blue, less than 1 milligram of auramine, 3000 cc. double distilled water. The negative stock may be soaked in this solution for 10 minutes at about 65° F. and then dried. Another solution suitable for the purpose comprises 5 grams of ferricyanide in 900 cc. of water to which is then added 100 cc. of a solution containing 0.6 milligram of fluorescein and 0.6 milligram of malachite green. A third illustrative solution comprises 10 grams of potassium ferricyanide in 1000 cc. of water to which 50 cc. of 28% hydrogen peroxide is added just before using. The film is soaked in this solution for about 4 minutes and allowed to dry without any washing.

I claim:

1. In a method of forming a composite photograph from two separate negatives bearing a background image and a foreground image respectively, the steps of: forming a latent unstable image of the background image upon the final negative by printing the background negative upon the final negative with light of wave lengths shorter than about 0.5 micron; then rendering the latent background image undevelopable in those portions only in which the foreground image is to be recorded, by subjecting those portions of the latent image upon the final negative to light of wave lengths longer than that to which the final negative emulsion is sensitive; forming a latent unstable image of the foreground image in those portions of the final negative in which the background image was rendered undevelopable; and finally developing such final negative and exposing it to light of substantially the entire spectrum during such developing to produce a composite photograph containing desired portions of the background image and the foreground image.

2. In a method of forming a composite photograph from two separate negatives bearing a background image and a foreground image respectively, the steps of: forming a latent unstable image of the background image upon the final negative by printing the background negative upon the final negative with light of wave lengths shorter than about 0.5 micron; then rendering the latent background image undevelopable in those portions only in which the foreground image is to be recorded, by subjecting those portions of the latent image upon the final negative to light of wave lengths longer than that to which the final negative emulsion is sensitive; forming a latent unstable image of the foreground image in those portions of the final negative in which the background image was rendered undevelopable, by printing the negative bearing the foreground image onto the final negative with light of wave lengths shorter than about 0.5 micron; and finally developing such final negative and exposing it to light of substantially the entire spectrum during such developing to produce a composite photograph containing desired portions of the background image and the foreground image.

3. In a method of forming a composite photograph from two separate negatives bearing a background image and a foreground image respectively, the steps of: forming a latent unstable image of the background image upon the final negative by printing the background negative upon the final negative with light of wave lengths shorter than about 0.5 micron; then rendering the latent background image undevelopable in those portions only in which the foreground image is to be recorded, by subjecting those portions of the latent image upon the final negative to light of wave lengths longer than about 0.6 micron; forming a latent unstable image of the foreground image in those portions of the final negative in which the background image was rendered undevelopable; and finally developing such final negative and exposing it to light of substantially the entire spectrum during such developing to produce a composite photograph containing desired portions of the background image and the foreground image.

4. In a method of forming a composite photograph from two separate negatives bearing a background image and a foreground image respectively, the steps of: forming a latent unstable image of the background image upon the final negative by printing the background negative upon the final negative with light of wave lengths shorter than about 0.5 micron; then rendering the latent background image undevelopable in those portions only in which the foreground image is to be recorded, by subjecting those portions of the latent image upon the final negative to light of wave lengths longer than about 0.6 micron; forming a latent unstable image of the foreground image in those portions of the final negative in which the background image was rendered undevelopable, by printing the negative bearing the foreground image onto the final negative with light of wave lengths shorter than about 0.5 micron; and finally developing such final negative and exposing it to light of substantially the entire spectrum during such developing to produce a composite photograph containing desired portions of the background image and the foreground image.

5. In a method of forming a composite photograph from two separate negatives bearing a background image and a foreground image respectively, the steps of: forming a latent unstable image of the background image upon the final negative; then rendering the latent background image undevelopable in those portions only in which the foreground image is to be recorded, by subjecting those portions of the latent image upon the final negative to light of wave lengths longer than that to which the final negative emulsion is sensitive; forming a latent unstable image of the foreground image in those portions of the final negative in which the background image was rendered undevelopable; and finally developing such final negative and exposing it to light of substantially the entire spectrum during such developing to produce a composite photograph containing desired portions of the background image and the foreground image.

6. In a method of forming a composite photograph from two separate negatives bearing a background image and a foreground image respectively, the steps of: forming a latent unstable image of the background image upon the final negative; then rendering the latent background image undevelopable in those portions only in which the foreground image is to be recorded; forming a latent unstable image of the foreground image in those portions of the final negative in which the background image was rendered undevelopable; and finally developing such final negative and exposing it to light of substantially the entire spectrum during such developing to produce a composite photograph containing desired portions of the background image and the foreground image.

7. In a method of printing a composite photograph in negative form from two separate negatives bearing a background image and a foreground image respectively in negative form, the steps of: forming a latent unstable image of the background image upon the final negative emulsion, said emulsion being adapted to form latent unstable images capable of being destroyed by light of wave lengths longer than those to which the emulsion is normally sensitive; then rendering the latent background image undevelopable in those portions only in which the foreground image is to be recorded; forming a latent unstable image of the foreground image in those portions of the final negative in which the background image was rendered undevelopable; and finally developing such final negative and exposing it to light of substantially the entire spectrum during such developing to produce a composite photograph in negative form containing desired portions of the background image and the foreground image.

8. In a method of printing a photograph from two separate negatives bearing a background image and a foreground image respectively, the steps of: forming a latent unstable image of the background image upon a final emulsion, then rendering the latent background image undevelopable in those portions only in which the foreground image is to be recorded; forming a latent unstable image of the foreground image in those portions of the final emulsion in which the background image was rendered undevelopable; and finally developing the emulsion to obtain a composite photograph.

9. In a method of printing a composite photograph from two separate negatives bearing a background image and foreground image respectively in negative form, the steps of: forming a latent unstable image of the background image upon the final emulsion by printing the background negative upon the final emulsion with light of wave lengths shorter than about 0.5 micron; then rendering the latent background image undevelopable in those portions only in which the foreground image is to be recorded, by subjecting those portions of the latent image upon the final emulsion to light of wave lengths longer than that to which the final emulsion is sensitive; forming a latent unstable image of the foreground image in those portions of the final emulsion in which the background image was rendered undevelopable; and finally developing the emulsion to obtain a photograph in positive form containing desired portions of the background image and the foreground image.

10. A method of the character described in claim 9 in which the final emulsion is substantially free from iodides and chlorides, such emulsion being adapted to form latent unstable images capable of being destroyed by light of wave lengths longer than those to which the emulsion is normally sensitive.

11. In a method of printing a photograph from two separate negatives bearing a background image and a foreground image respectively in negative form, the steps of: forming a latent unstable image of the background image upon the final emulsion by printing the background negative upon the final emulsion with light of wave lengths shorter than about 0.5 micron; then rendering the latent background image undevelopable in those portions only in which the foreground image is to be recorded, by subjecting those portions of the latent image upon the final emulsion to light of wave lengths longer than about 0.6 micron; forming a latent unstable image of the foreground image in those portions of the final emulsion in which the background image was rendered undevelopable, by printing the negative bearing the foreground image onto the final emulsion with light of wave lengths shorter than about 0.5 micron; and finally developing the emulsion to obtain a photograph in positive form containing desired portions of the background image and the foreground image.

12. A method of the character defined in claim 6 in which the final negative is provided with an emulsion which is substantially free from iodides and chlorides, said emulsion being adapted to form latent unstable images capable of being destroyed by light of wave lengths longer than those to which the emulsion is normally sensitive.

CHARLES B. DREYER.